Nov. 24, 1925.
S. P. CURTIS
COMBINED HARROW AND GRASS SEEDER
Filed Aug. 30, 1924    3 Sheets-Sheet 1
1,563,261
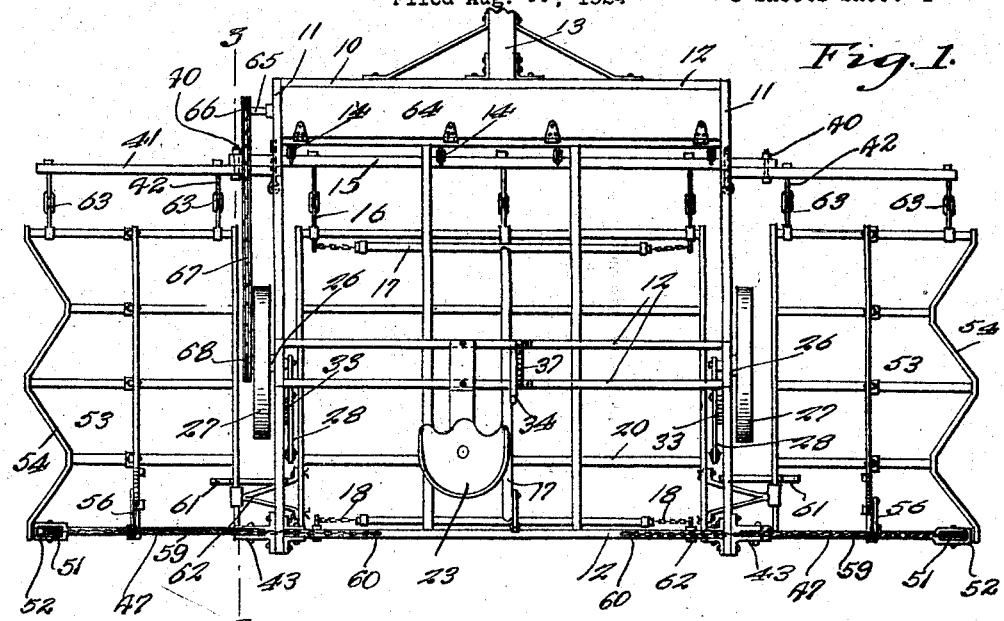

Nov. 24, 1925.  1,563,261
S. P. CURTIS
COMBINED HARROW AND GRASS SEEDER
Filed Aug. 30, 1924   3 Sheets-Sheet 2

S. P. Curtis, INVENTOR
BY Victor J. Evans
ATTORNEY

WITNESS:

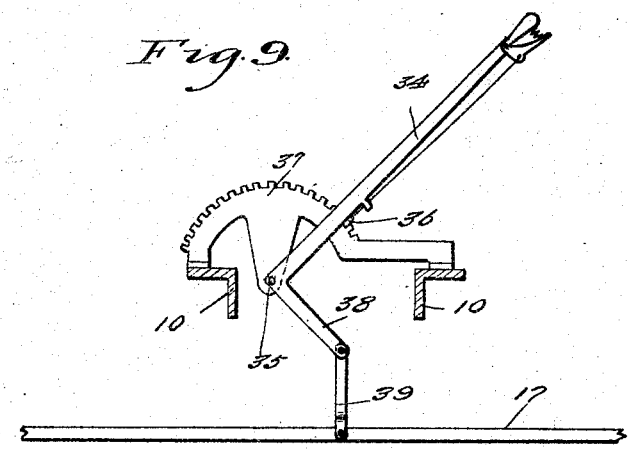
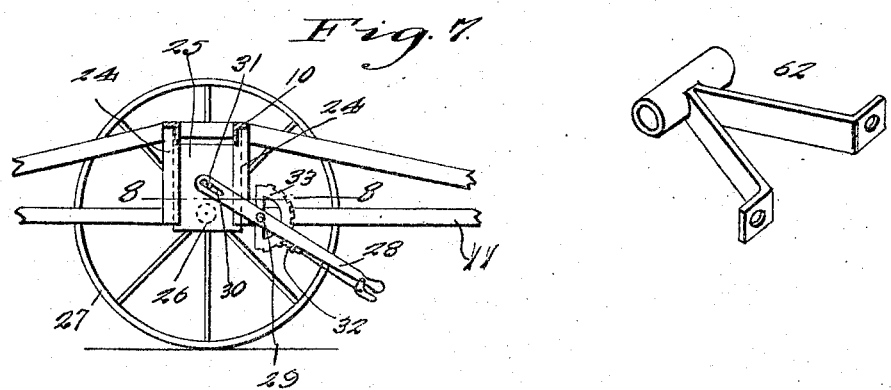
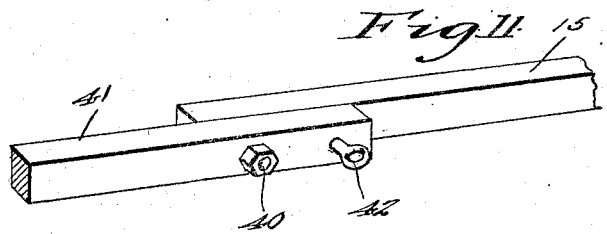

Patented Nov. 24, 1925.

1,563,261

UNITED STATES PATENT OFFICE.

SIMON PETER CURTIS, OF MISSOURI VALLEY, IOWA.

COMBINED HARROW AND GRASS SEEDER.

Application filed August 30, 1924. Serial No. 735,209.

*To all whom it may concern:*

Be it known that I, SIMON P. CURTIS, a citizen of the United States, residing at Missouri Valley, in the county of Harrison and State of Iowa, have invented new and useful Improvements in Combined Harrows and Grass Seeders, of which the following is a specification.

This invention relates to agricultural implements and has for its object the provision of a novel seeder and harrow, the harrow itself being of peculiar construction and foldable whereby it may be drawn along through comparatively narrow gateways, across small bridges and the like without it being necessary to dismantle the machine and load it upon a wagon or the like.

An important object is the provision of a machine of this character provided with means whereby the harrow may be lifted out of engagement with the ground whereby to facilitate transportation when not in use.

Another object is the provision of a peculiar mechanism whereby the main harrow may be lifted and the main frame be also lifted with respect to the surface traveled over.

A further object is the provision of a machine of this character embodying many details of construction and arrangement of parts which will be a manifest improvement and which will facilitate the use.

An additional object is the provision of a machine of this character which will be simple and inexpensive in manufacture, easy to operate and control, positive in action, efficient and durable in service, and a general improvement in the art.

With the above and other objects and advantages in view, the invention consists in the details of construction to be hereinafter more fully described and claimed, and illustrated in the accompanying drawings, in which:—

Figure 1 is a plan view of the device in fully operative position.

Figure 2 is an end view with the normal position shown in full lines, and the swung position of the side harrows illustrated by dotted lines.

Figure 4 is a detail perspective view of one of the supporting arms of the side harrow members.

Figure 7 is a fragmentary detail view illustrating the mounting for the wheels whereby the main frame may be adjusted up or down.

Figure 9 is a detail fragmentary sectional view illustrating the mechanism for raising and lowering the main harrow.

Figure 10 is a detail perspective view of one of the stop brackets for preventing crowding, and Figure 11 is a fragmentary perspective view showing the connection or mounting of the forward arms of the side harrow members.

Figure 3:
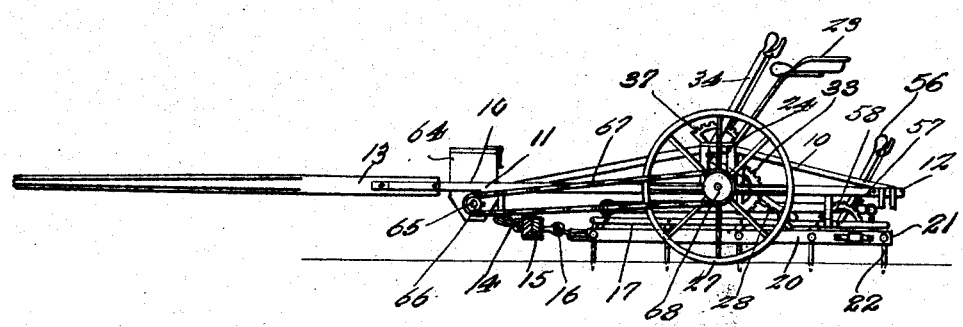
Figure 3 is a section on the line 3—3 of Figure 1.
Figure 6:
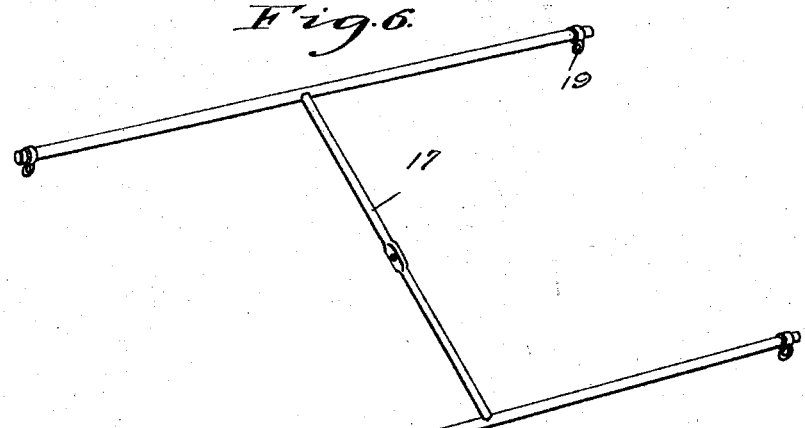
Figure 6 is a detail perspective view of the supporting member which carries the main harrow.

Referring more particularly to the drawings, the numeral 10 designates broadly the main frame of the device, which frame includes longitudinal or side members 11 connected by a plurality of cross members 12 and equipped with any suitable draft device 13 secured in any desired manner to the forward cross bar. Flexibly connected with the next to the forward cross bar 12, as shown at 14, is an evener 15 from which is suspended by link elements 16, an H shaped frame 17 which is similarly suspended from the rear cross member 12 by other chains 18.

Mounted below the H shaped frame member 17 and suspended therefrom as for instance by means of links 19 is the main harrow 20 formed as a suitable frame 21 having a plurality of teeth 22 depending therefrom. It should also be stated that the main frame is equipped with a seat 23 for the accommodation of the operator.

Secured upon the sides of the main frame are guides 24 within which are slidable blocks or plates 25 from which project stubs 26 on which are journaled ground engaging wheels 27. For regulating the position of the main frame with respect to the ground traveled over, I provide, at each side of the machine, an elongated lever 28 which is pivoted at 29 upon the main frame and formed with a slot 30 engaging a pin 31 on the plate or block 25. The levers 28 are equipped with grip release latching pawls 32 cooperating with notched segments 33. Obviously, by adjusting these levers it is apparent that the plates or blocks 25 may be moved within the guides so that the height of the main frame above the surface travelled over may be adjusted.

For raising and lowering the main harrow member 20, I provide a lever 34 which is pivoted at 35 and equipped with a grip release latching pawl 36 cooperating with a notched segment 37 mounted on the main frame. The lever 34 is operatively connected with a crank arm 38 with which is pivotally connected a link 39 which is in turn pivotally connected with the central portion of the H-shaped frame 17. By adjusting the lever 34 it is quite evident that the height of the frame 17 may be varied so that the harrow suspended therefrom may be withdrawn from engagement with the ground when the device is being moved from place to place.

Figure 5:
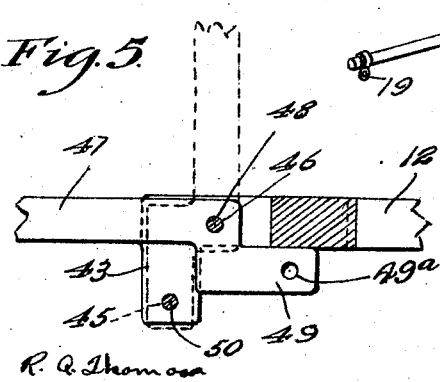
Figure 5 is a detail view illustrating the mounting of one of the rear arms of the side harrow members.
Figure 8:
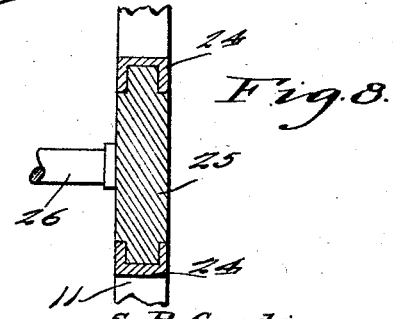
Figure 8 is a section on the line 8—8 of Figure 7.

The evener 15 projects beyond both side members 11 of the main frame 10, and pivoted at 40 upon the projecting ends are arms 41 adapted to be held in horizontal position in alinement or registration with the evener 15 by means of pins 42 passing through registering holes in the inner ends of the arms 41 and the outer ends of the evener. Secured on the rear ends of the side bars 11 are bracket devices 43 of angular shape formed with holes 45 and 46. The numeral 47 designates arms somewhat similar to the arms 41 but disposed at the rear end of the machine. These arms 47 are pivoted by means of bolts 48 which pass therethrough and through the holes 46 in the bracket members 43. The arms 47 are provided with extensions or lugs 49 formed with holes 49$^a$ through which may be passed bolts 50 which may be engaged through the holes 45 for holding the arms 47 in vertical position as shown in dotted lines in Figure 5. Ordinarily, the arms 47 are in horizontal position as shown by full lines in the same figure. In other words, the bolt 50 functions in exactly the same manner as the pins 42 associated with each of the front arm members 41. At their outer ends the arms 47 carry suitably journaled grooved rollers 51 located within yoke-like guides 52.

The numeral 53 designates the auxiliary or side harrows which are mounted at the sides of the main harrow 20 outwardly of the sides 11 of the main frame 10. These side harrows 53 include the usual frames 54 having adjustably mounted teeth 55 depending therefrom.

These side harrows 53 are equipped with the usual control levers 56 having the ordinary and well known grip release locking devices 57 which cooperate with notched segments 58 and which are provided for the purpose of adjusting the angular inclination of the teeth 55. These side harrows are held in association with the remainder of the machine by means of chains 59 which are connected with the outer ends of the harrow frames and which are trained over the guide rollers 51 with their inner ends detachably connected with hooks 60 carried by the main frame. Secured on the main frame are hook-like brackets 61 upon which may be engaged the inner sides of the harrows 53 when it is desired to elevate them into the vertical position shown by dotted lines in Figure 2. After the side harrows have been engaged on these hook members 61 it is apparent that pulling upon the chains 59 will operate to swing the harrows after which the chains are intended to be reengaged with the hooks 60 for holding the harrows against subsequent downward swinging.

To avoid crowding of these side harrows 53 against the ground engaging wheels of the machine, I provide a suitable number of stop brackets 62 secured upon the rear portions of the main harrow 20 and adapted to be engaged by the side harrows 53 for limiting their swinging movement toward the center of the machine in case of side draft.

It should also be stated that these side harrows 53 are suspended from the arms 41 by means of links 63 and it is apparent that this connection will to a certain extent operate to prevent the side sway or swinging of the harrow members.

In order that the device may be used for sowing grass or the like, if preferred, I make use of a conventional seeder mechanism including a hopper 64 mounted on the forward portion of the main frame 10 and containing any suitable seed dropping mechanism, not shown, operated by means of a shaft 65 which projects beyond one end of the hopper. Mounted on this projecting end of the shaft is a sprocket 66 about which is trained a chain 67 which extends rearwardly and which is also trained about the sprocket 68 carried by one of the ground engaging wheels 27. Obviously, when the device is drawn along, the seed dropping mechanism will be operated by this chain drive and will sow grass seed or the like.

In the operation, it will be apparent that normally the side harrow members 53 are in alinement with the main or central harrow member 20 so that a large area may be cultivated in a very satisfactory manner. By manipulating the levers 28 it is apparent that the height of the main frame above the ground travelled over may be varied and by manipulating the lever 34 it is apparent that the main harrow member 20 may be withdrawn entirely from engagement with the ground, this feature being of great importance when the device is being transported along roads or the like where its use is not desired.

When it is necessary to transport the device through gateways or across narrow bridges and the like, it is apparent that in addition to raising the main harrow member 20 from the ground, the side harrows 53 may be lifted so that their inner ends are engaged upon the bracket members 61 after which pulling upon the chains 59 will result in swinging the side harrows into a vertical position as shown by dotted lines in Figure 2 so that there will be no interference with the sides of gateways, doorways, bridges or the like. Obviously, by engaging the chains 59 upon the hooks 60 the side harrows may be held indefinitely in such vertical position until positively and manually returned to normal position. Owing to the provision of the pins 42 and 50 it is apparent that when the device is in use the side harrows 53 will be locked firmly so as to be rigid with respect to the main harrow and be consequently incapable of up and down movement with respect thereto. It is likewise true that when the side harrows are in vertical position the pins 50 will operate to lock them in such position and prevent them from accidentally falling down.

From the foregoing description and a study of the drawings, it will be apparent that I have thus provided a comparatively simple, inexpensive and easily operated and controlled combined harrow and seeder which will be of great advantage for the reasons above pointed out and which will efficiently perform all the functions for which it is intended.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In a harrow, a main frame, a main harrow member suspended below said frame, ground engaging wheels for the frame, arms pivotally mounted at the sides of the main frame, means for holding said arms against pivotal movement, and side harrows flexibly suspended between said arms.

2. In a harrow, a wheel supported main frame, a main harrow suspended from the frame, arms pivotally connected at the front and rear of the sides of the main frame, side harrows suspended between the front and rear arms, means normally holding said arms against pivotal movement, and means for swinging said second named harrows upwardly into substantially vertical position.

3. In a device of the character described, a wheel supported main frame, a main harrow suspended therefrom, forward and rear arms pivotally connected with said main frame at the front and back corners thereof, means for securing said arms against movement in horizontal or in vertical position, side harrows flexibly suspended between said front and rear arms, means connected with said side harrows for swinging them into vertical position.

4. In a device of the character described, a wheel supported main frame, a main harrow suspended therefrom, forward and rear arms pivotally connected with said main frame at the front and back corners thereof, means for securing said arms against movement in their vertical or in horizontal position, side harrows flexibly suspended between said front and rear arms, means connected with said side harrows for swinging them into vertical position, and brackets on the sides of the main frame adapted to have the inner sides of the side harrows engaged thereon whereby to serve as fulcrums.

In testimony whereof I affix my signature.

SIMON PETER CURTIS.